United States Patent [19]

Fioravanti

[11] Patent Number: 4,986,872
[45] Date of Patent: Jan. 22, 1991

[54] DEVICE FOR SEALING ENVELOPES AND THE LIKE MADE OF PLASTIC MATERIAL

[75] Inventor: Pietro Fioravanti, Schio, Italy

[73] Assignee: P.F.M. S.p.A., Torrebelvicini, Italy

[21] Appl. No.: 394,354

[22] Filed: Aug. 15, 1989

[30] Foreign Application Priority Data

Dec. 9, 1988 [IT] Italy ................. 85673 A/88

[51] Int. Cl.$^5$ ............................................. B32B 31/18
[52] U.S. Cl. .................................. 156/515; 156/251; 156/518; 156/530
[58] Field of Search ............... 156/251, 515, 530, 518; 493/189, 203, 205, 206, 209; 53/548, 553

[56] References Cited

U.S. PATENT DOCUMENTS

| | | | |
|---|---|---|---|
| 3,415,704 | 12/1968 | Bate | 156/515 |
| 3,740,300 | 6/1973 | Heinzer | 156/583.4 |
| 4,048,003 | 9/1977 | Bolli | 156/515 |
| 4,120,235 | 10/1978 | Beck | 156/515 |
| 4,487,599 | 12/1984 | Bendig et al. | 156/515 |
| 4,838,981 | 6/1989 | Fioravanti | 156/530 |

Primary Examiner—Caleb Weston
Attorney, Agent, or Firm—Bucknam and Archer

[57] ABSTRACT

The device comprises two paddles 1 each one of them being connected to a bar 3, the extremities of which are placed within a cam track. The cam track is formed in the surface turned towards the working zone of support 18 which is located corresponding to both the lateral extremities of the device. The motion of the bars 3 and therefore of the paddles 1 along the cam track 8 which has a rectilinear section 8' and a section of circular sector 8", is determined for each bar by a pair of connecting rods 7 which has a slit 7. The two ends of the bars 3 close to the extremities are placed in the slit. The four connecting rods 7 rotate synchronously, the rods corresponding to the same paddle being in the same direction, the rods corresponding to the same side of the device being opposite to the other. The device also comprises arms 4 and pin 5 capable of preventing motions of the bars which could be inconsistent with the paddles during the working operation in the phase where they follow a rectilinear motion and are placed in contact one with the other.

4 Claims, 5 Drawing Sheets

DEVICE FOR SEALING ENVELOPES AND THE LIKE MADE OF PLASTIC MATERIAL

The present invention relates to a device for sealing envelopes made of plastic material and the like, and more specifically to a device to be used in apparatuses for sealing envelopes of the type of continuous horizontal apparatuses.

Devices comprising in particular two superimposed shafts disposed with axes parallel and rotating in opposite direction have been known. Each shaft carries at least one paddle capable of carrying the sealing of the transversal borders of an envelope made of a plastic material, plastified paper and the like. Very frequently one of the two paddles comprises a knife capable of carrying out the cut of the material in the form of a ribbon which is wound around the product and forms the envelopes so as to separate one envelope from the others.

In the case in which the material to be used for wrapping is of the type which is sealable under heating conditions (polyethylene), there are provided one or more electrical resistors located within the paddles. The resistors, after the current goes through them, permit to heat the working surface of the paddles.

The main disadvantage of this type of device consists of the fact that the two paddles remain in contact for a very limited angular section. Therefore, for the purpose of obtaining a sealing of acceptable quality, it is necessary to reduce the rate of rotation of the paddles so as to increase the period of time of reciprocal contact between the same paddles, a fact which clearly causes a reduction of the productivity of the same apparatus.

For the purpose of eliminating this drawback, a device has been proposed in which the paddles do not travel along a circular path around the axis of the shaft which places the paddles in rotation, but on the contrary, they travel linearly corresponding to the working phase, the travel remaining circular in the phase in which the paddles are not in reciprocal contact. This result is achieved by providing one or more rollers pivoted at the extremities of the bars which support the paddles, the rollers traveling on a cam track with a radius which varies with respect to the axis of the shaft which places the paddle in rotation.

In this manner it is clear that the distance from the working surface of the paddle to the axis of the shaft varies, and particularly, is the least corresponding to the linear portion in which the effective sealing action is carried out by the paddles, and that in order to permit this variation of the radius, there is provided a specific means of connection between the paddles and the shafts which place the paddles in motion.

However, the presence of the rollers mentioned hereinabove which are essential to avoid that the paddles and therefore the bar perform inconsistent motions during the linear phase of travel, places a very precise limit to the amount of sealing pressure which can be applied on the paddles.

Further, the presence of the two parallel shafts disposed obviously in transversal direction with respect to the direction of advance of the products, limits very precisely the thickness of the wrappings to be worked on.

In order to eliminate these drawbacks a device has been conceived and built, which is described in Italian application No. 85.542 A/87 filed by the same applicant in which the paddles carry out a linear rather than a curvilinear motion corresponding to their working area. This is achieved due to the fact that the supporting bar of each of the two paddles is disposed corresponding to its extremities in a cam track which has a rectilinear portion corresponding to the working area and a section of circular shape. The main feature of this device consists of the fact that the bars hereinabove corresponding to an area close to their extremities are disposed in a slot formed in a connecting rod which is placed in rotation by suitable means.

In this manner the bar and also the paddle which is connected with it are compelled to follow the motion of the connecting rod and travel along the cam track mentioned hereinabove. There are also provided means capable of avoiding that the bar and also the paddle perform inconsistent motions in the rectilinear section. These means consist of a pair of arms disposed perpendicularly with respect to the same bar, the arms being pivoted corresponding to the opposite extremity, to a carriage which runs on a guide staff horizontally disposed, the axis of which lies on the working plane of the paddles. This carriage performs an alternating motion along the same staff corresponding to the motions of the paddle, along the cam track. This device permits with respect to the known similar apparatuses discussed hereinabove to operate with wrappings of substantially greater thickness and also permits to increase substantially the sealing pressure exerted by the paddle corresponding to the transversal limbs of each wrapping.

An object of the present invention is to improve the device mentioned hereinabove, particularly with respect to the means used to avoid the inconsistent motions mentioned hereinabove, as well as the motions of the connecting rods and the particular shape of the same connecting rods.

One feature of the present invention consists of providing a pair of arms connected to each of the paddles, the arms being disposed corresponding to the same body side of the apparatus, the arms converging in a common pin which is disposed corresponding to the horizontal axis of symmetry of the device. This pin performs a rectilinear travel corresponding to the axis mentioned hereinabove, and corresponding to the motion of the paddles subsequent to the rotation of the connecting rods, thus avoiding the possibility of any inconsistent motion of the same paddles during the rectilinear phase of travel.

The present invention also provides that the motion of the connecting rods occur by means of a kinematic chain utilizing in particular the same shaft which places in rotation the mechanisms placed on the two opposite sides of the apparatus and corresponding to each of the two sides a pulley which by means of belts and two additional pulleys places in rotation the two connecting rods. This system ensures rigorous uniformity of the rate of rotation of the several connecting rods so as to avoid the risk of displacement between the same paddles. In the Italian patent application mentioned hereinabove, there is described a mechanism of the motion of the connecting rods which comprises in particular a transmission of motion by means of four gears between the connecting rods disposed respectively at the extremities of the kinematic chain, a fact which is likely to give rise to some displacement even minimal between the connecting rods, and in particular between the same connecting rods placed on the extremities.

The invention also provides the possibility of conforming the same connecting rods so that they assume substantially the shape and function of flywheels, thus increasing their overall moment of inertia and ensuring in this manner greater regularity of rotation of the same.

These and other features of the present invention will be described hereinbelow in detail with reference to the accompanying drawings of which:

Figure 1:
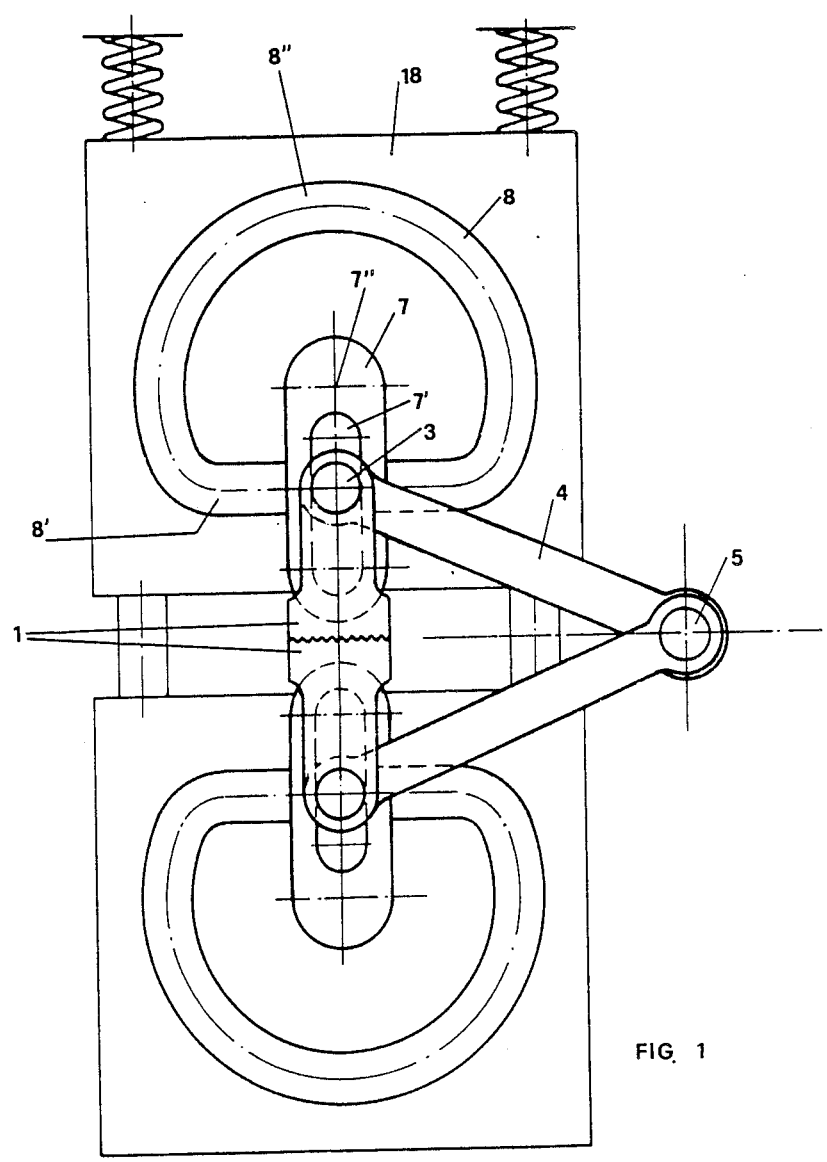
FIG. 1 is a schematic side view of the device of the present invention with the paddles in the working position.

FIG. 1 shows that the device of the present invention comprises a pair of paddles 1 opposite one to the other, each paddle being connected to a supporting bar 3 which near both of its extremities is inserted within a slit 7', formed longitudinally in a connecting rod 7. The extremities of the bars are inserted in a cam track 8 formed on the surface turned towards the working area of the support 18.

This cam track presents a rectilinear section 8' disposed corresponding to the working area and a circular section 8" in the form of an arc of circumference. In view of the fact that the links 7 are placed in rotation by suitable means around the transversal axis 7", it is clear that the supporting bar 3 and therefore, the paddles 1 are forced to follow the predetermined path of the cam track 8 where suitable rolling means disposed corresponding to the extremities of the same bars 3 operate. The presence of the slit 7' permits to vary the radius assumed by the axis of the bar 3 with respect to the axis of rotation 7" due to the eccentricity of the cam track 8.

Figure 2:
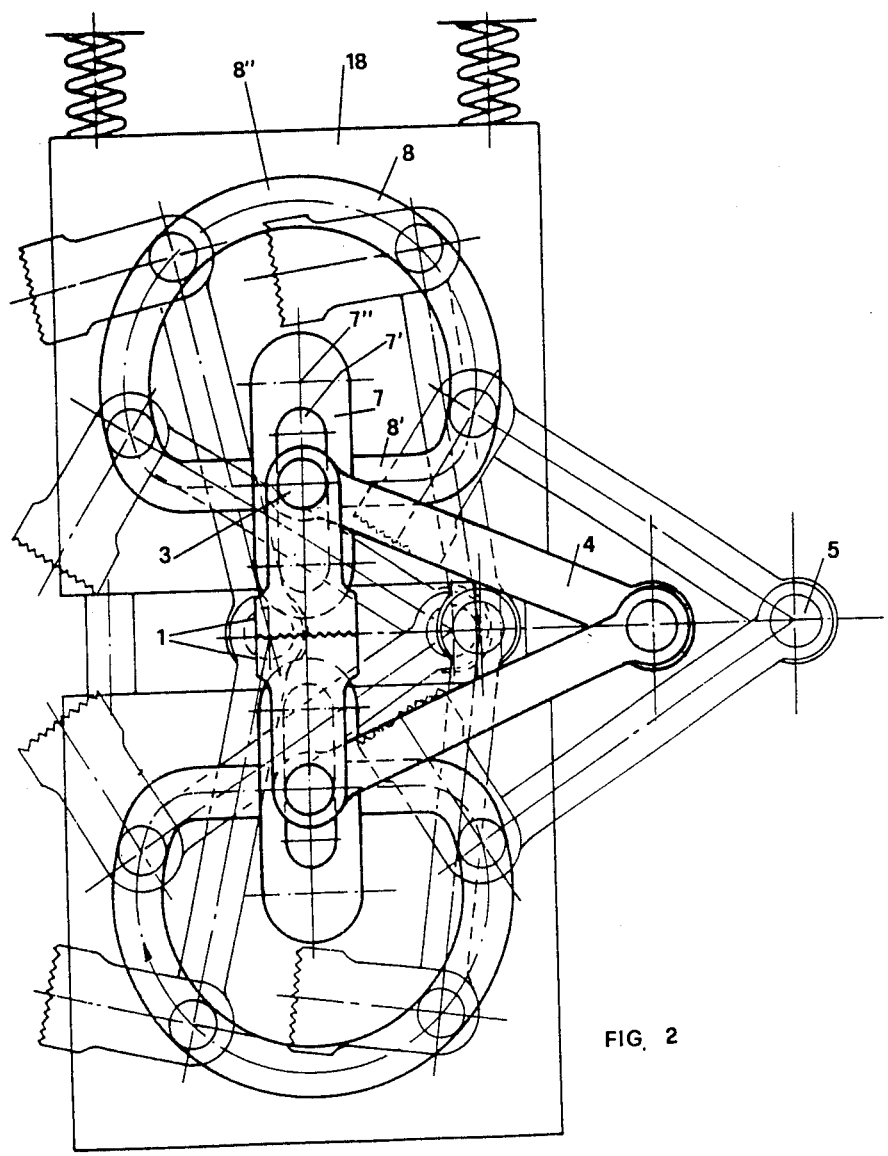
FIG. 2 is the same view with the paddles in different positions of the cam track.

FIG. 2 shows that the paddles may assume a multitude of positions during the rotation of the connecting rod 7. It is clear that the paddles must rotate synchronously and in opposite direction.

The directions of rotation shown in the figure are only intended by way of example, and they could also be inverted with no difficulty.

The useful course of the paddles is limited by the rectilinear section 8' where they are in contact at first for a limited portion of their opposite faces, and then for the total extension of the faces, and finally for a portion of the same which becomes smaller up to the point when they separate one from the other, thus ensuring the sealing and eventually the cutting of the transversal borders of the wrappings.

All these features are known in the art, and they have been shown in the patent application mentioned hereinabove. In the present case, however, there is provided an original device capable of avoiding inconsistent motions of the paddles 1 corresponding to the rectilinear section 8'. For this purpose it is provided that a pair of arms 4 is disposed corresponding to the extremities of the bars connected to each of the paddles.

The arms 4 fixed to different paddles and all disposed corresponding to the same side of the device converge in a common pin 5 disposed corresponding to the horizontal axis of symmetry of the same device which lies on the working plane of the two paddles. Because of the motion of the connecting rods, the angle comprised between the two arms obviously varies while the angles formed between each of the two arms and the central axis remain reciprocally the same. Pin 5 is intended to move, but due to the symmetry of the apparatus always along the central axis without the necessity of a structure intended specifically to compel the pin to follow the same run, as was the case of the device with the carriage and the guiding staff used in the device according to the patent application mentioned hereinabove.

By eliminating this structure it is possible to obtain advantages with respect to the simplicity of the apparatus and the function of the apparatus which permit to obtain a working speed substantially superior with respect to the device described in the patent application mentioned hereinabove.

According to a specific embodiment of the invention there is provided that the handling of the motion of the structures placed corresponding to the sides of the device comprises a motion group 14 which transmits the motion to two pulleys 15 which are co-axial and connected to each other, each one of them being disposed corresponding to one of the sides of the apparatus. These pulleys place in rotation the driven pulleys 16 and 17 by means of belts 15'.

Advantageously the belt is wound around the upper pulley 17 and is still disposed laterally with respect to the lower pulley 16.

Figure 3:
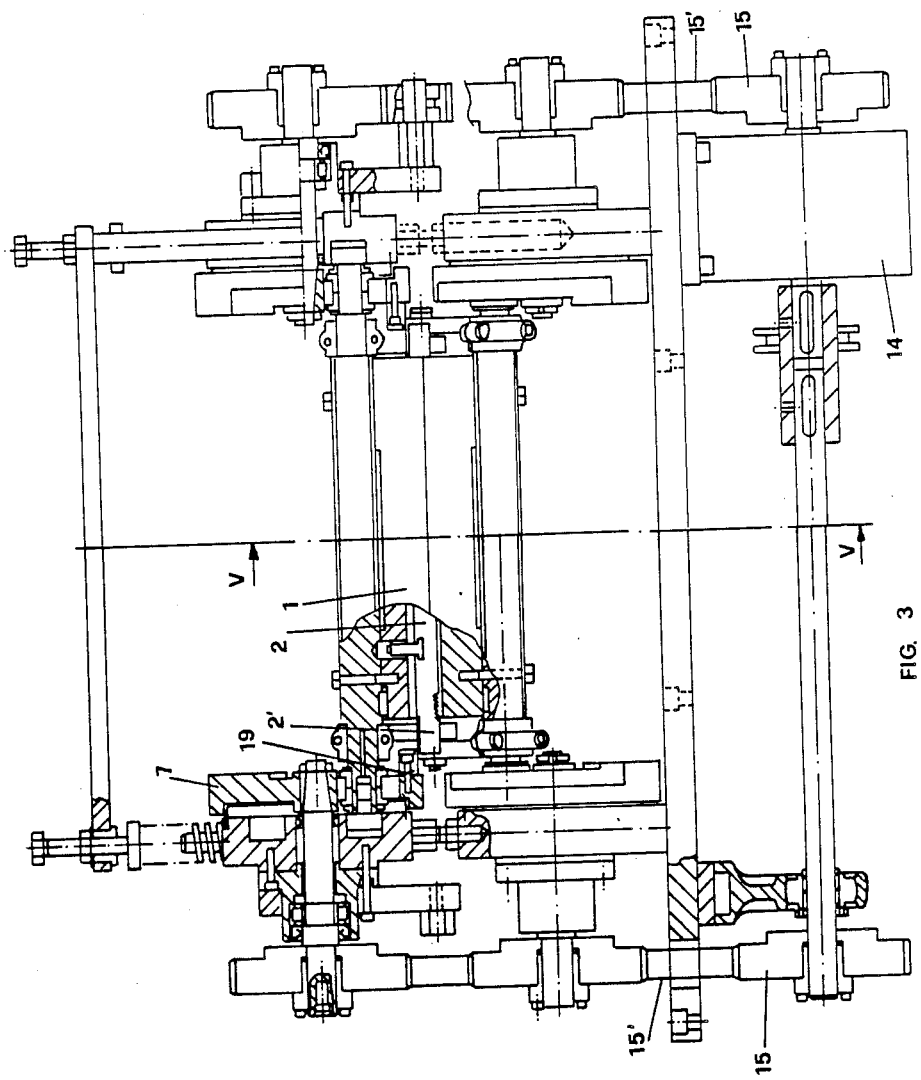
FIG. 3 is a front detailed view of the apparatus partially in cross-section.
Figure 4:
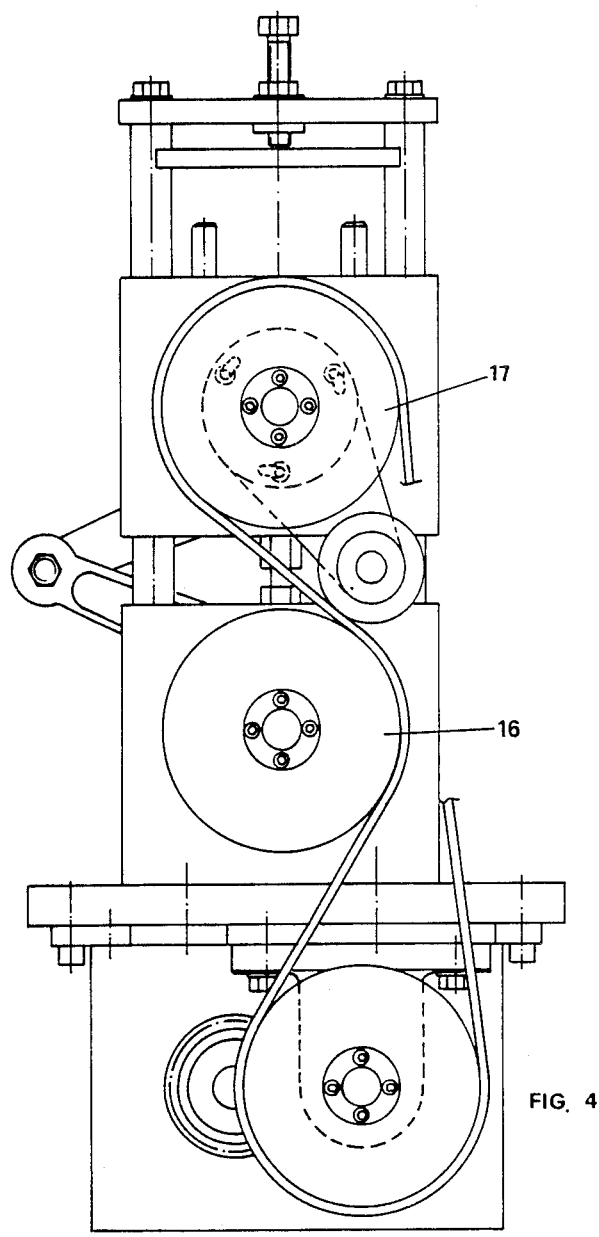
FIG. 4 is a lateral view of the device.
Figure 5:
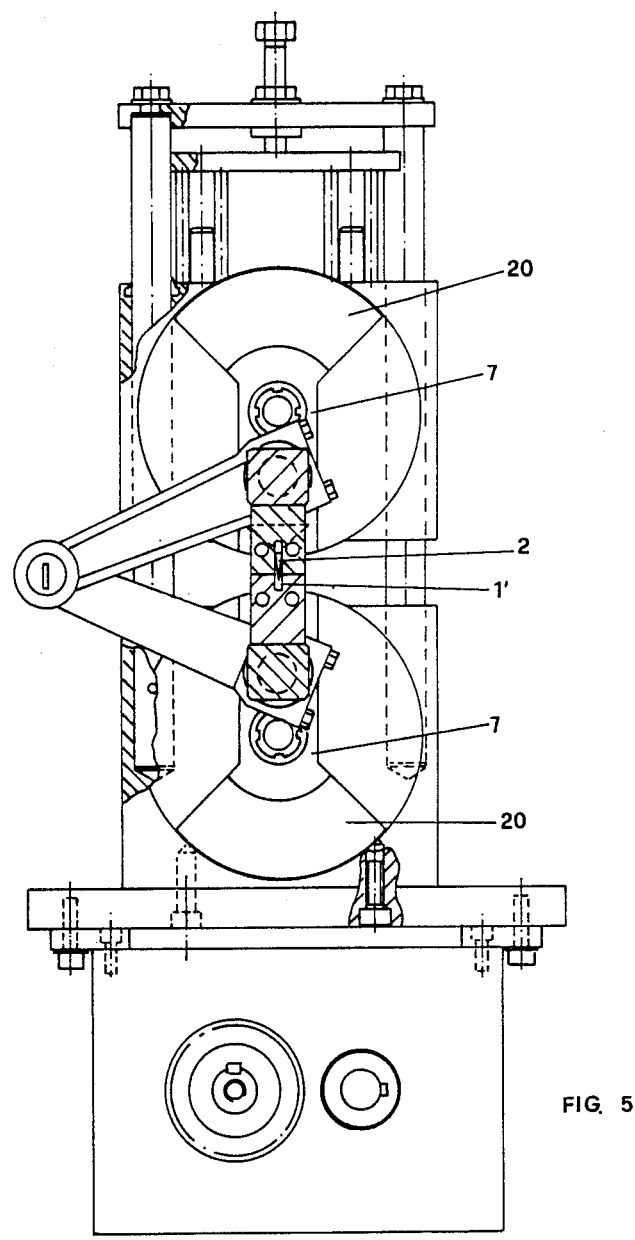
FIG. 5 is a lateral view of the device according to cross-section along line V—V of FIG. 3.

Another feature to the present invention resides in the fact that as shown in FIG. 5 the connecting rods 7 provide in the area in which there is no slit as mentioned hereinabove, an extension 20 in the form of a circular sector. The presence of this extension 20 is capable of increasing the overall moment of inertia of each connecting rod so that each connecting rod serves as a true flywheel regulating the momentary velocity of rotation of the same connecting rods due to the fact that the presence of the paddles disposed always on one side of the connecting rods with respect to the axis 7" is compensated. Also in this case the device may be rendered capable of carrying out the cutting operation corresponding to the transversal extremities of two successive rods. In this manner the knife, cutting according to the manner described in the patent application mentioned hereinabove, is seated within a suitable cavity formed on the working surface of one of the two paddles 1 as shown in FIG. 3 while another cavity 1' is provided on the opposite paddle in order to allow the blade of the knife to dip into the same cavity when the knife must carry out the cutting operation. (See FIG. 5.) This knife is fixed according to well-known manner on the bottom of the cavity which contains it by means of elastic means which have the tendency to pull it towards the interior of the cavity.

For the purpose of determining the cutting action exerted by the knife 2 corresponding to the moment in which the two paddles are in contact, there is provided that the knife exits laterally from the cavity in which it is seated by means of two extensions 2', because it is provided that on the extremities of the connecting rods 7 connected with the paddle in which the knife is seated, there are fixed two blocks 19. In view of the fact that the connecting rod 7 rotates according to a rigorously circular course, while the paddles 1 follow an eccentric course, the extremities 2' of the knife interfere with the blocks 19, a fact which determines the exits of the knife from the cavity in which it is seated so that the envelope is cut.

What is claimed is:

1. A device for sealing an envelope of plastic material which comprises two paddles (1) having parallel axes rotating in the opposite direction and synchronously, said paddles traveling on an eccentric trajectory, said device having two lateral heads, a support (18) disposed corresponding to each of said heads, and corresponding to both paddles a cam track (8), formed in said support, means connected with said paddles sliding within said cam track, said cam track having a rectilinear section, the extremities of which are connected by a circumferential sector, a supporting bar (3) connected to each of the two paddles, said supporting bar being placed in motion at its extremities by a pair of connecting rods (7), said connecting rods having a slit (7'), the said bar having portions close to its extremities, said portions being seated in said slits (7'), the extremities of the bar (3) being disposed within the said cam track (8), said connecting rods (7) being placed in motion so as to rotate in a synchronous manner, the connecting rods of each of the pair placed corresponding to each of the paddles rotating in the direction opposite with respect to the direction of the other pair, means for avoiding inconsistent motion of the paddles in the area in which the motion of the paddles is rectilinear, said means comprising two pairs of arms (4) disposed at the extremities of the bars (3), the arms disposed on the same side of the device converging in a common pin (5) disposed on the axis of the symmetry of the device and lying on a plane corresponding to the plane of operation of the paddles.

2. The device according to claim 1 wherein both connecting rods (7) have an extension (20) in the form of a circular sector on the portion opposite to the portion in which the slit (7') is located.

3. The device according to claim 1 wherein the motion of the entire apparatus is provided by two pulleys (15), said pulleys being connected to each other and being co-axial, said pulleys placing in rotation by means of belt (15') pulleys (16 and 17) the connecting rods (7).

4. The device according to claim 1 for cutting the transversal borders of the envelope, comprising a knife (2), said knife being seated in a cavity which extends along the entire length of one of the paddles, said knife being fixed to the bottom of the cavity by elastic means, said elastic means pulling said knife within the cavity, another cavity (1') being formed on the paddle opposite to the paddle wherein said knife is seated, said knife (2) having two lateral extensions (2'), said extensions extending laterally in the exterior of said paddle and comprising a block (19) on the connecting rod (7) corresponding to the paddle wherein said knife is located, said block (19) being of such dimensions that it may be placed in contact with the extremity (2') of said knife (2), thus pulling said knife downwardly when said paddle (1) is in the phase of rectilinear motion.

* * * * *